April 16, 1940.  B. F. WADDELL  2,197,230

THERMOSTATIC CONTROL

Filed Dec. 20, 1937  6 Sheets-Sheet 1

INVENTOR
Benson F. Waddell
BY Pennie, Davis, Marvin & Edmonds
ATTORNEYS

April 16, 1940.                B. F. WADDELL                2,197,230
                           THERMOSTATIC CONTROL
                         Filed Dec. 20, 1937          6 Sheets-Sheet 2

INVENTOR
Benson F. Waddell
BY
Pennie Davis Marvin & Edmonds
ATTORNEYS

April 16, 1940.  B. F. WADDELL  2,197,230

THERMOSTATIC CONTROL

Filed Dec. 20, 1937   6 Sheets-Sheet 4

INVENTOR
Benson F. Waddell
BY
Pennie Davis Marvin & Edmonds
ATTORNEYS

April 16, 1940.  B. F. WADDELL  2,197,230
THERMOSTATIC CONTROL
Filed Dec. 20, 1937    6 Sheets-Sheet 5

INVENTOR
Benson F. Waddell
BY
Pennie Davis Marvin & Edmonds
ATTORNEYS

April 16, 1940. B. F. WADDELL 2,197,230
THERMOSTATIC CONTROL
Filed Dec. 20, 1937 6 Sheets-Sheet 6

INVENTOR
Benson F. Waddell
BY
Pennie Davis Marvin & Edmond
ATTORNEYS

Patented Apr. 16, 1940

2,197,230

UNITED STATES PATENT OFFICE 2,197,230

THERMOSTATIC CONTROL

Benson F. Waddell, Jackson Heights, N. Y., assignor to The Wilcolator Company, Newark, N. J., a corporation of Delaware Application December 20, 1937, Serial No. 180,710

19 Claims. (Cl. 200—140)

This invention relates to regulators for use on heaters, refrigerators and the like to control the temperature within an oven, cooling chamber or similar space. More particularly, the invention is concerned with a novel regulator of this type in which a control element, such as a valve or switch, is movable with a snap action by thermo-responsive means at a selected temperature. The new regulator is of simple construction and is accurate and reliable in operation.

While the principles of the present invention may be employed in connection with valves, switches or other devices which it is desired to regulate, the invention will be described for illustrative purposes in connection with a thermostatically controlled switch of the so-called "snap" type adapted for controlling the temperature in an oven of a range. It will be understood, however, that the invention is not limited to this use.

One feature of the present invention resides in the provision of a snap-acting mechanism of compact construction which is adapted for sensitive and positive operation without the use of parts requiring delicate adjustment. A snap-acting mechanism made in accordance with my invention comprises a member, preferably flexible, movable laterally about one end which is fixed, and a compression spring connected to the free end of the member and extending outwardly toward the fixed end thereof. The outer end of the spring is connected to the free end of a laterally movable bar or lever which extends inwardly toward the free end of the flexible member to which the spring is connected. The spring is thus adapted to exert an expansive force on the flexible member and lever which urges these members away from their fixed ends and thereby subjects the members to tension. Preferably, the spring is normally confined in compression with the end thereof which is connected to the lever disposed on one side of the plane of the flexible member, whereby the spring exerts its expansive force on the flexible member at an angle thereto so as to urge the free end of the member laterally in one direction. The lever is movable against the expansive action of the spring to force the end of the spring connected thereto through the plane of the flexible member to the other side thereof, whereupon the plane of compression of the spring is reversed with respect to the flexible member so that the spring snaps the free end of the flexible member in the opposite direction. When the lever is moved back toward its initial position, the end of the spring connected thereto is again moved through the plane of the flexible member to the first side thereof, so that the spring snaps the parts back to their original positions. The movement of the lever to actuate the snap-acting mechanism is preferably effected by thermo-responsive means having a heat-sensitive element in the oven to be controlled.

With this construction, the spring, flexible member and actuating lever may be arranged in substantially parallel relation with the flexible member and spring disposed between the ends of the lever, so that the mechanism may be enclosed in a relatively small space. The movable member of the switch is preferably connected to the free end of the flexible member, and when it is so connected it will remain stationary at all times except when the flexible member is snapped from one position to the other. Since the lever and flexible member are normally held in tension by the spring, it is unnecessary to employ accurately adjusted stops for retaining the parts in their proper relation as is common in mechanisms of this type in which the spring maintains one or more of the parts under compression. In the present construction, the movable switch member will suffice to arrest and limit the movement of the snap-acting mechanism from one side to the other of its critical position. The lever operates the mechanism to move the plane of compression of the spring alternately from one side of the plane of tension of the flexible member to the other, so that the spring exerts turning moments on the flexible member which reverse and snap the free end of the member back and forth. However, the pivot or fulcrum of the lever is preferably so positioned that the spring exerts a turning moment in only one direction on the lever, whereby the lever and the end of the spring connected thereto are constantly urged toward one side of the plane of the flexible member. This latter feature permits operation of the mechanism by the application of a force in only one direction on the actuating lever, the lever moving automatically in the opposite direction under the action of the constant turning moment exerted thereon by the spring.

The thermo-responsive means for actuating the snap-acting mechanism may take various forms, but I prefer to employ for this purpose a closed system including a bulb adapted to be mounted in the oven, and an expansible and contractible chamber, such as a bellows, outside the oven connected to the bulb through a flexible tube, the bulb, tube and bellows being filled with a thermo-responsive fluid. In modern ranges employing thermo-responsive means of this type, the bellows is commonly disposed near the front of the range where it is influenced by temperature changes resulting from operation of the exterior burners, and unless proper provision is made, these changes in temperature outside the oven will affect the fluid in the bellows and cause faulty operation of the regulator. In the new regulator, such faulty operation is avoided by making the operating lever of the snap-acting mechanism bimetallic so that it will flex in response to temperature changes resulting from operation of the exterior burners and thereby automatically compensate for the effect of these temperature changes on the fluid in the bellows. The bimetallic lever of the new snap-acting mechanism is of a novel form such that its effective length is not varied by flexing thereof due to temperature changes, whereby faulty operation of the snap-acting mechanism resulting from flexing of the lever is avoided.

When the snap-acting mechanism is used to control a switch, I prefer to employ a switch comprising a pair of fixed contacts and a conductor connected to the snap-acting mechanism and movable thereby into engagement with the contacts. To assure proper engagement of the conductor with the two contacts, I provide novel means whereby the conductor is self-adjusting to compensate for misalignment of the contacts. The conductor is connected to the snap-acting mechanism through a swivel joint which permits the conductor to rock and thereby equalize the pressure on the contacts, even though the contacts are not accurately positioned with respect to the conductor. If desired, the snap-acting mechanism may be arranged to control a double switch including two pairs of contacts. The two pairs of contacts are adapted to be bridged by a pair of conductors swiveled on opposite ends of an arm pivotally connected intermediate its ends to the snap-acting mechanism. With this construction, the arm may rock to compensate for misalignment with respect to the two pairs of contacts, and the conductors may swivel to compensate for misalignment of the contacts in each pair.

Another feature of the present invention resides in the provision of novel means for controlling the operation of the snap-acting mechanism. The control means comprises an operating handle, or the like, for manually actuating the snap-acting mechanism and also for varying the response thereof to movement of the thermo-responsive means. The operating handle has a locking mechanism associated therewith for locking the snap-acting mechanism in one of its positions and thereby preventing operation thereof by the thermo-responsive means. The locking mechanism preferably includes a cam operatively connected to the dial, and a locking member movable by the cam relative to the snap-acting mechanism. The cam may be turned with the dial to an "off" position, and as it is turned it moves the locking member into locking relation with the snap-acting mechanism. Preferably the locking member acts through a spring, and when the cam and dial are moved from the "off" position the spring renders the locking member inoperative and releases the snap-acting mechanism. The spring yields upon continued movement of the locking member after it has locked the snap-acting mechanism, and thereby prevents damage of the parts.

Still another feature of the present invention is in the provision of novel means for indicating the condition of the regulator. The indicating means is controlled jointly by the thermo-responsive means and the manually operated means for actuating the snap-acting mechanism. Preferably, the indicating means is normally inactive, but operates to give a signal when the dial is turned to move the snap-acting mechanism away from the normal position, and to give a different signal when the thermo-responsive means returns the snap-acting mechanism to its normal position.

These and other features of the new regulator may be better understood by reference to the following description taken in conjunction with the accompanying drawings, in which—

The regulator of the present invention is preferably of the type employing a thermo-expansible liquid contained in a closed system including a bulb located within the oven, a flexible metal tube extending from the bulb to the exterior of the oven, and an expansible and contractible chamber connected to the outer end of the tube. A regulator of this type is described in Patent No. 1,978,362, granted October 23, 1934. It will be understood, however, that the principles of the invention may be employed in thermostatic regulators of other types as well.

Referring to the drawings, the bulb adapted to be mounted within the oven is shown at 30 and the tube leading therefrom at 31. The tube 31 leads from the bulb to a casing 32 which houses a control mechanism for the oven. The casing comprises a front section 33, preferably of non-conducting material, and a rear section 34, the two sections being held together by bolts 35. The bolts extend through the front section 33 near the corners thereof and are threaded into the rear section 34. The rear section 34 is provided with an opening 36 communicating with the interior of the casing, and secured over the opening 36 is a cup 37 having its open end toward the casing. A flexible metal bellows 38 is sealed within the cup 37 to form an annular space 39 between the cup and bellows constituting an expansible and contractible chamber. The open end of the cup 37 is sealed to the casing and by an annulus 40 disposed between the rear section 34 of the casing and a flange 41 on the cup, the cup and annulus being held tightly against the casing by bolts 37' extending through the flange and annulus and threaded into the rear section 34 of the casing.

Figure 1:
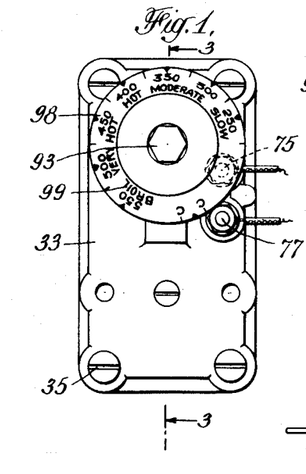
Fig. 1 is a front view of one form of the new regulator.
Figure 2:
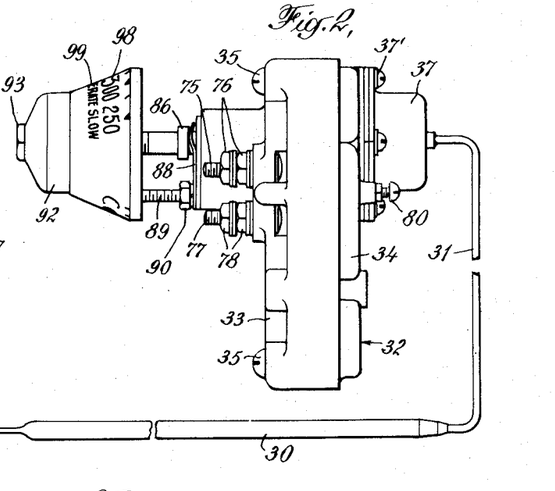
Fig. 2 is a side view of the regulator shown in Fig. 1.
Figures 3, 4:
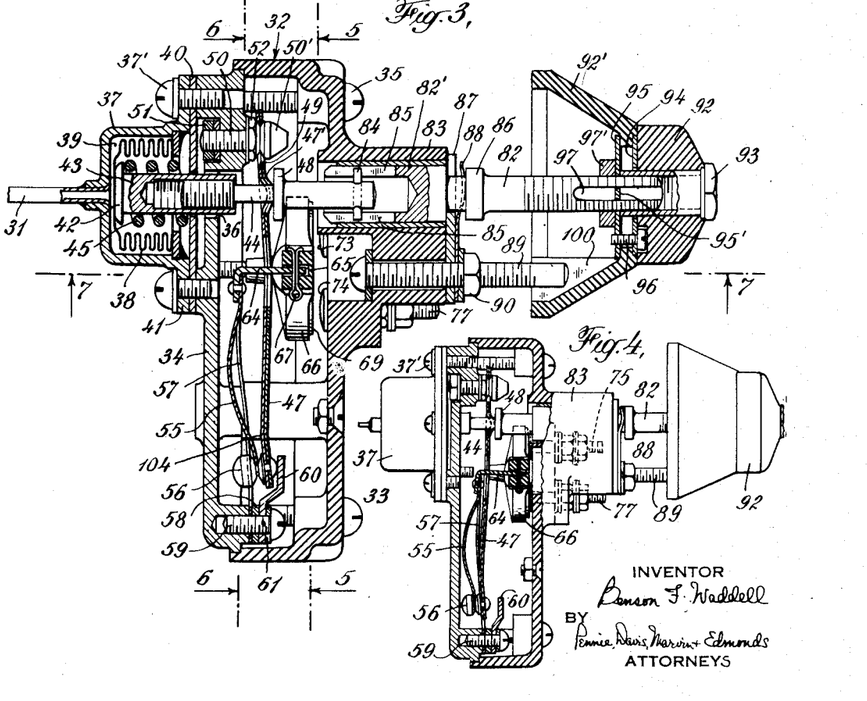
Fig. 3 is an enlarged section on the line 3—3 in Fig. 1, showing the thermostatically controlled snap-acting mechanism of the present invention and the actuating means therefor.
Fig. 4 is a partial section on the line 3—3 in Fig. 1, showing the snap-acting mechanism in a different position.

A disk 42 lies against the rear end of the bellows, and a stem 43 secured at its end to the disk extends through the front end of the bellows, the annulus 40 and opening 36. The stem 43 has a rod 44 threaded in the front end thereof, the rod extending forwardly from the stem through the casing. A spring 45 arranged between the disk 42 and annulus 40 tends to keep the bellows expanded by urging the stem 43 and rod 44 to the left as shown in Fig. 3. The tube 31 leads into the space 39 through the rear wall of cup 37, and the bulb 30, tube 31, and space 39 are filled with a thermo-expansive liquid, such as chlorinated diphenol, which actuates the bellows and the rod 44 connected thereto in response to a change in temperature in the oven. Movement of rod 44 by the bellows controls the operation of a snap-acting mechanism which will now be described.

The rod 44 extends forwardly from its threaded end through an opening in a bimetallic bar or lever 47, to be described in detail presently, and is formed with a shoulder 48 which normally engages lugs 47' on the front face of the bar at opposite sides of the opening. Near its upper end above the rod 44, the bar 47 is provided with a circular opening 49 through which a pivot pin 50 extends. The pin 50 passes through the rear section 34 of the casing and is secured by a nut 51 threaded on its outer end, the nut being received in a recess formed in the rear face of section 34. The pin 50 is formed at its front end with a head 50', and behind the head 50' the pin is formed with a hexagonal section 52, whereby a spanner may be applied to the pin to facilitate tightening of the nut 51 thereon. The portion of the bar 47 surrounding the opening 49 therein is beveled to provide a knife edge extending around the opening, as shown in Fig. 3. The knife edge near the top of the bar is disposed in a circumferential recess formed in the pin 50 between the head thereof and the hexagonal section 52.

A flat metal compression spring 55 is disposed behind the bar 47 substantially parallel thereto and normally maintains the bar in tension. The spring 55 is engaged at its lower end with a knob 56 fixed on the lower end of the bar. As shown particularly in Figs. 3 and 5, the spring 55 is curved slightly at its lower end and fits into a recess in the head of knob 56. The upper end of spring 55 is integral with the free upper end of a strip of spring metal 57 which confines the spring against expansion in an upward direction. The strip 57 is substantially rectangular in form and is clamped at its lower end to the rear section 34 of the casing by means of a cross member 58. The member 58 is held in position against the lower end of strip 57 by a bolt 59 which extends through the member 58 and strip 57 and is threaded into the rear section 34 of the casing. A stop 60 is interposed between the cross member 58 and a washer 61 on the bolt, the stop extending forwardly and upwardly from the bolt and terminating in front of the knob 56 on bar 49. Preferably, the flexible confining strip 57 is further secured at its lower end by pins 62 connected to the rear section 34 of the casing and extending through the strip 57 and cross member 58. The spring 55 extends downwardly from the free end of confining strip 57 in a central longitudinal slot 63 (Figs. 5 and 6) formed in the strip intermediate its ends, the slot 63 and integral spring 55 of the strip being preferably formed by a stamping operation. Normally, the spring 55 lies in the plane of strip 57, but when the parts are assembled the spring is distorted out of the plane of the strip and confined in compression in a bowed form between the free end of strip 57 and the knob 56, as shown in Fig. 3.

A leg 64 is riveted to the free end of the confining strip 57 and extends forwardly through a central opening in bar 47 into a slot 65 formed in a cross arm 66. The cross arm 66 is made of insulating material and is pivotally connected to the front end of leg 64 by a cotter pin 67 extending through the cross arm and the leg, whereby the cross arm may rock endwise on the leg. The ends of the arm 66 are enlarged so that the arm has the general form of an "H", the enlarged ends of the arm being recessed on the front face of the arm, as shown at 68. Pivotally mounted in the recess 68 at one end of the cross arm is a conducting member 69. As shown particularly in Fig. 7, the bottom of member 69 is formed with a rounded projection 69' intermediate its ends which engages a rounded projection 70 formed on the cross arm. The conducting member 69 is held in engagement with the projection 70 by a headed pin 71 mounted on the cross arm and extending loosely through the member 69 so as to permit the member to rock transversely of the cross arm in the recess 68. The conducting member 69 cooperates with a pair of contacts 73 and 74 mounted on the inside of the front section 33 of the casing. The contact 73 forms the head of a terminal bolt 75 which extends through the front section 33 of the casing, the bolt 75 being secured against removal by lock nuts 76. Similarly, the other contact 74 forms the head of a terminal bolt 77 extending through the front section 33 and held in position by lock nuts 78 outside the casing. The cross arm 66 may be moved by spring member 55 toward or away from the contacts 73, 74 to effect their electrical connection and disconnection. The movement of the cross arm away from the contacts is limited by projections 79 on the rear face of the cross arm near the ends thereof, the projections 79 being arranged to engage the threaded ends of bolts 80 when the cross arm is moved a predetermined distance away from the contacts. The bolts 80 are threaded through the wall of the rear section 34 and are adjustable to vary the extent of the movement of cross arm 66 away from the contacts.

The rod 44 is adapted to be moved axially independently of the bellows 38 by manually operated means comprising a shaft 82 rotatably mounted in a hollow boss 83 integral with the front of the casing. The inner end of the shaft is enlarged in the boss at 82' and is provided with a central longitudinal bore in which the front end of rod 44 is loosely fitted. The rod 44 has a pin 84 extending transversely therethrough near its front end, the ends of the pin being loosely disposed in opposed longitudinal slots 85 formed in the enlarged end 82' of the shaft. In front of the hollow boss 83, the shaft 82 is formed with a shoulder 86, and between the shoulder and the enlarged end 82' of the shaft are a metal plate 87 and a strip of spring metal 88 through which the shaft extends. The plate 87 engages the front end of boss 83, and the spring 88 lies against the front face of the plate with its upper end spaced from the plate and in engagement with the shoulder 86. The plate 87 and spring 88 are held in this position by a bolt 89 which extends through the front section 33 of the casing and through the lower portions of the plate and spring, the head of the bolt being arranged in a recess formed in the rear face of section 33. A nut 90 is threaded on the bolt to clamp the plate 87 and spring 88 against the end of boss 83.

A knob 92 is held on the shaft 82 by a cap nut 93 threaded on the front end of the shaft, the shank of the nut extending through a central bore in the knob. A dial 92' is clamped on the shaft between plates 94 and 95 which are connected by a bolt 96 having its head received in a suitable recess in knob 92. The plate 94 has a central opening through which the shank of cap nut 93 extends, while the plate 95 has a key 95' received in a keyway 97 formed in shaft 82, whereby rotation of the knob and dial causes the shaft to turn. A nut 97' is threaded on the shaft and holds the plates 94, 95 and the dial 92' against the rear end of knob 92. The dial has a scale of temperature graduations 98 arranged thereon, together with suitable indicia 99 for indicating the condition of the oven corresponding to the various temperatures shown on the dial. When the knob 92 is rotated, the rotation is transmitted through the shaft 82 and pin 84 to the rod 44, whereby the rod is moved helicoidally in the threaded bore of stem 43. Rotation of the dial is preferably limited by a lug 100 on the inside of the dial, the lug being adapted to engage the threaded end of bolt 89. It will be apparent that the spring 88 urges the shaft 82 to the right, as seen in Fig. 3, so as to maintain the forward end of the enlarged portion 82' of the shaft in close engagement with plate 87 and thereby provide a braking effect on movement of the shaft and dial. This braking effect prevents accidental turning of shaft 82 which might otherwise occur due to jarring or vibration incident to operation of the snap-acting mechanism.

The casing 32 is mounted on an electric range (not shown) so that the knob 92 is accessible at any convenient place. The terminal bolts 76 and 77 are then connected in series with the electric heating element for the oven, whereby bridging of the contacts 73 and 74 will close the circuit through the heating element. Preferably, a master switch (not shown) is included in the circuit of the heating element and is open when the regulator is not in use, so as to prevent accidental closure of the heating circuit.

When it is desired to heat the oven, the master switch is first closed. Assuming that the dial 92' is at a temperature setting higher than the temperature of the oven, as will generally be the case when the oven is at room temperature, the mechanism will be initially in the position shown in Fig. 4, wherein the contacts 73 and 74 are bridged so as to complete the circuit through the heating element. That is, the shoulder 48, due to the extremely contracted state of the liquid chamber 39, maintains the lower end of bar 47 to the left, so that the corresponding end of spring 55 is held to the left of the plane of the flexible strip 57. Accordingly, the expansive action of spring 55 urges the free upper end of strip 57 and the cross arm 66 connected thereto toward the right so that the conducting member 69 is held firmly against the contacts 73, 74. The dial 92' is then turned so that the graduation 98 corresponding to the desired oven temperature is in alignment with an index (not shown) fixed on the range. This operation of the dial adjusts the position of shoulder 48 relative to the bellows 30 and thereby determines the distance through which the bellows will have to move toward the right (Fig. 4) to permit the bar to move the lower end of spring 55 through the plane of strip 57.

In the event the dial 92' is set at a temperature lower than the temperature of the oven when the master switch is closed, the parts of the mechanism will be in the position shown in Fig. 3. As there shown, the bellows 38, due to its relatively collapsed state, permits the lower end of bar 47 to assume a position to the right, wherein the lower end of spring 55 is to the right of the plane of the flexible strip 57. The free upper end of strip 57 and the cross arm 66 connected thereto will then be urged toward the left by the expansive action of the spring, so as to maintain the conducting member 69 out of engagement with the contacts. In this event, the circuit through the oven heater is completed by turning the knob 92 clockwise to a higher temperature setting so as to move the shoulder 48 and bar 47 toward the left, whereby the lower end of spring 55 is forced through the plane of strip 57 to the position shown in Fig. 4. As the lower end of spring 55 moves through the plane of strip 57 from right to left, the turning moment exerted by the spring on strip 57 is reversed and causes the free upper end of strip 57 to snap to the right and thereby engage conductor 69 with the contacts. The dial 92' is then set to the desired temperature as previously described.

As the temperature in the oven rises, the liquid in bulb 30 expands and moves the closed end of bellows 38, together with its stem 43, to the right against the action of spring 45. Movement of stem 43 to the right by the bellows permits the bar 47 to follow shoulder 48 to the right under the action of spring 55. That is, when the parts are in the position shown in Fig. 4, the upper end of spring 55 is disposed slightly to the left of a line through the pivoted end of bar 47 and the lower end of spring 55, and accordingly the spring 55 will exert a turning moment on the bar tending to move it toward the right.

When the temperature in the oven corresponds to the temperature to which the dial 92' is set, the bar 47 assumes a critical position between those shown in Figs. 3 and 4 and holds the lower end of spring 55 in the plane of strip 57. Further movement of bar 47 to the right due to a further rise in the oven temperature causes the bar to move the lower end of the spring to the right of the plane of strip 57, so that the spring reverses its action with respect to the strip 57 and urges the free upper end of the strip to the left with a snap action. The rapid movement of the upper end of strip 57 toward the left by the spring 55 disengages the conducting member 69 from contacts 73, 74 and snaps the cross arm 66 toward the left until it is seated on the stop bolts 80 (Fig. 3). The circuit through the heating element of the oven is thus broken to prevent a further rise in the oven temperature.

As the temperature in the oven falls substantially below that for which the dial is set, the contraction of the liquid in bulb 30 causes the spring 45 to move the bellows and stem 52 to the left (Fig. 3), thereby forcing the bar 47 to the left about its pivot 50 against the action of spring 55. As the lower end of the bar moves the corresponding end of spring 55 through the plane of strip 57, the spring 55 will again reverse its action with respect to strip 57, whereupon the spring will snap the cross arm 66 back to its circuit-closing position, shown in Fig. 4. The heating element will then be re-energized to heat the oven to the desired temperature indicated on the dial 92', and the circuit-opening operation previously described will be repeated.

When the parts are in the circuit-closing position shown in Fig. 4 and the oven is heated, the snap-acting mechanism may be actuated independently of the bellows 38 to return the mechanism to its initial position. The return of the snap-acting mechanism to its initial position may be effected manually by rotating the dial 92' in a counterclockwise direction, whereby the rod 44 is moved toward its extreme righthand position in stem 43. This causes the bar 47 (Fig. 4) to follow the shoulder 48 on the rod under the action of spring 55 until the lower end of the spring is moved to the right of the plane of confining strip 57. Thereupon, the compression spring 55 snaps the mechanism back to its circuit-opening position, as previously described.

It will be apparent that the new snap-acting mechanism does not require the use of accurately adjusted stops for limiting its extreme positions. The latter are determined only by the positions which it assumes when the conductor 69 engages contacts 73, 74 and when the cross arm is seated on stop bolts 80, respectively. Also, the spring 55 is so arranged with respect to the flexible strip 57 and bar 47 that it exerts a turning moment on the bar tending to urge the lower end thereof toward the right, regardless of the position of the bar. This construction permits operation of the mechanism by the application of a force in only one direction on the bar, so that the sliding connection between the rod 44 and bar 47 may be employed. The sliding connection referred to is a desirable feature in a device of this character, in that it permits expansion of the thermo-responsive liquid to continue after the heater has been shut off, without injury to the parts of the mechanism. That is, if the oven temperature should for any reason continue to increase after the heater is shut off, the free end of bellows 42 moves to the right under the action of the expanding liquid and merely disengages the shoulder 48 from the bar. When the oven cools, the contracting liquid in bulb 30 causes the rod 44 to move to the left and return shoulder 48 into engagement with the bar, whereupon the normal operation is resumed.

Figure 5:
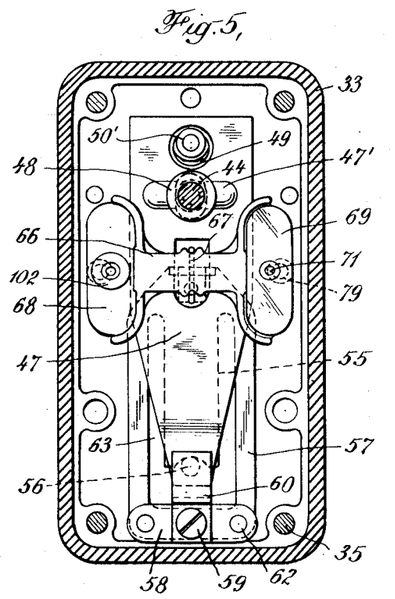
Figs. 5, 6 and 7 are sections on the lines 5—5, 6—6 and 7—7, respectively, in Fig. 3.
Figure 6:
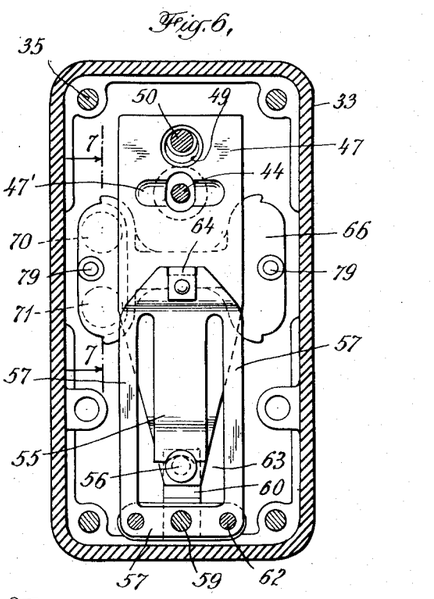
Figures 7, 8:
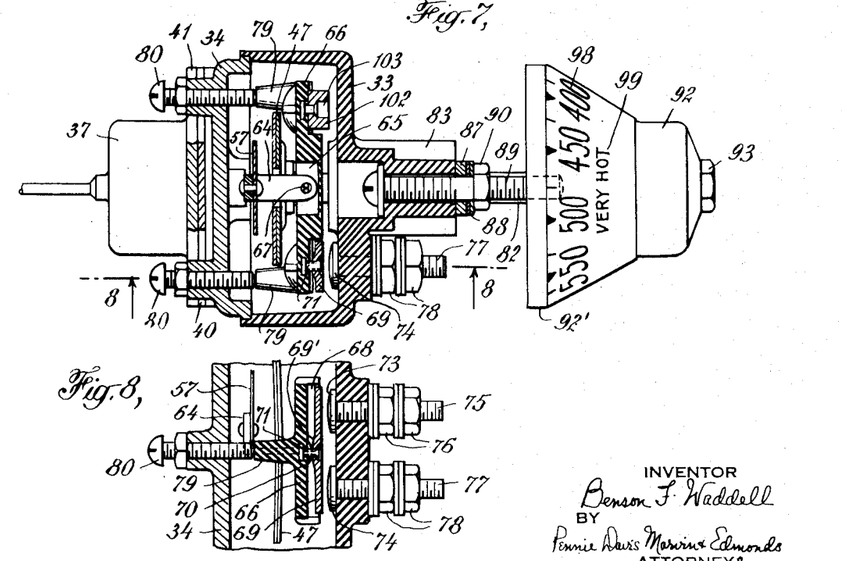
Fig. 8 is a section on the line 8—8 in Fig. 7 with parts of the regulator broken away.
Figure 9:
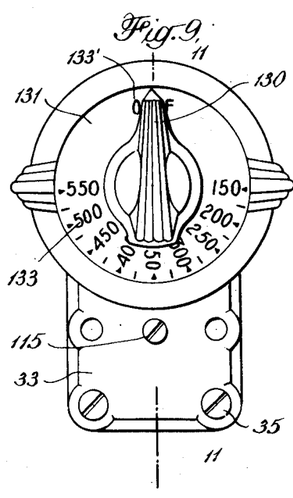
Fig. 9 is a front view of another form of the regulator embodying means for locking the snap-acting mechanism in one position.
Figure 10:
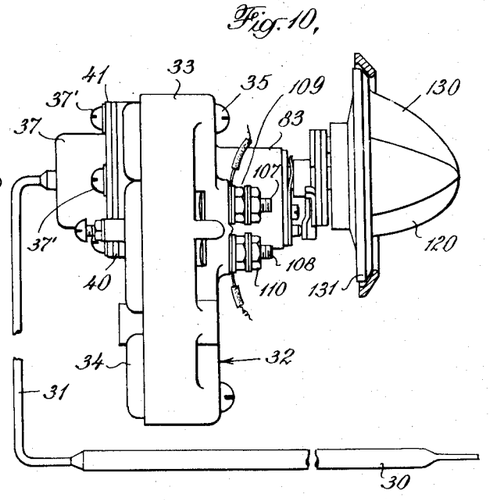
Fig. 10 is a side view of the regulator shown in Fig. 9.

It will also be apparent that the snap-acting mechanism of the new regulator operates in a positive manner to effect a quick "make" or "break" of the heating circuit and is operable by only a slight movement of bar 47. By reason of the pivoted connection between cross member 66 and the leg 64 and the swivel joint between conducting member 69 and the cross arm, any misalignment of contacts 73, 74 will be automatically compensated for. That is, if one of the contacts 73, 74 projects inwardly a greater distance than the other, the conducting member 69 will swivel about the pivot 71 and automatically adjust itself to the misalignment of the contacts. Also, if the contacts 73, 74 should be moved toward or away from the conducting member 69 in any manner, this condition will be automatically compensated for by the pivoted connection of the cross arm to the leg 64 which permits the cross arm to rock lengthwise. Preferably, the left-hand end of cross arm 66, which does not carry a conducting member, has a collar 102 pivoted thereon by a pivot pin 103 similar to the pin 71 (Figs. 5 and 7). The function of the collar 102 is to engage the rear face of the front section 33 when cross arm 66 is in its circuit-closing position and thereby maintain the cross arm in substantially parallel relation to the rear face of section 33.

The bar 47 is bimetallic, as previously described, and is arranged with the low expansion metal on the left side (Figs. 3 and 4) so that a rise in temperature causes the free lower end of the bar to flex toward the left. With this construction, a rise in the ambient temperature resulting, for example, from operation of an exterior heater near casing 32 and causing the liquid in chamber 39 to effect a false movement of bar 47 to the right, will be compensated by the simultaneous movement of the lower end of the bar to the left due to flexing of the thermostatic metal, whereby the position of the lower end of the spring will remain unchanged. Conversely, a decrease in the ambient temperature causing a false contraction of the liquid in chamber 39 and movement of the bar to the left, will be accompanied by a flexing of the bar to the right so that the lower end thereof will remain stationary. Accordingly, the operation of the regulator is unaffected by changes in temperature around the casing 32, and the latter may be mounted in any desired location on the range, regardless of the proximity of exterior burners.

As the bar 47 flexes due to ambient temperature changes, it tends to straighten or curve itself, and unless suitable provision were made, this action would result in a change in the effective length of the bar and thereby affect the operation of the regulator. To prevent changes in the effective length of the bar in this manner, I prefer to construct the bar in form shown particularly in Fig. 3. As there shown, the bar is bent transversely at a point spaced slightly inwardly from the lower end thereof, as shown at 104, so that at room temperature, when the bar is substantially straight, the lower end of the bar extends downwardly to the right. Accordingly, when the bar flexes to the left upon a rise in temperature, tending to shorten its effective length, the bent lower end of the bar is moved toward a vertical position and thereby tends to increase the effective length of the bar, and as a result the effective length of the bar remains unchanged. Conversely, when the bar tends to straighten itself upon a decrease in temperature, the bent lower end thereof moves more obliquely to the right and tends to shorten the effective length of the bar.

The regulator shown in Figures 9 to 14, inclusive, is provided with mechanism for automatically locking the snap-acting mechanism in its circuit-opening position when the dial is in its "off" position, and for automatically releasing the locking mechanism when the dial is moved away from its "off" position. The regulator there shown includes thermo-responsive means, a snap-acting mechanism and a casing similar in all respects to the corresponding parts of the regulator shown in Figures 1 to 8, inclusive, and accordingly these parts need not be further described. In the regulator shown in Figs. 9 to 14, inclusive, the cross arm 66 cooperates with two pairs of contacts mounted in the casing on the front wall thereof, one pair 73, 74 being mounted near one side of the casing and the other pair 105, 106 being mounted near the opposite side of the casing. The contacts 105 and 106 are similar to contacts 73, 74 and form the heads of terminal bolts 107 and 108, respectively. The bolts 107 and 108 extend through the front of the casing and are held in position by lock nuts 109 and 110, respectively, threaded on their outer ends. The contacts 105 and 106 are adapted to be electrically connected by a conducting member 111 which is mounted in the recess 68 on the left-hand end of cross arm 66 (Figure 12) in place of the collar 102 shown in Figs. 5 and 7. The conducting member 111 is similar in all respects to the conducting member 69 and is mounted to swivel on a pivot pin 112 similar to the pin 71.

Figure 11:
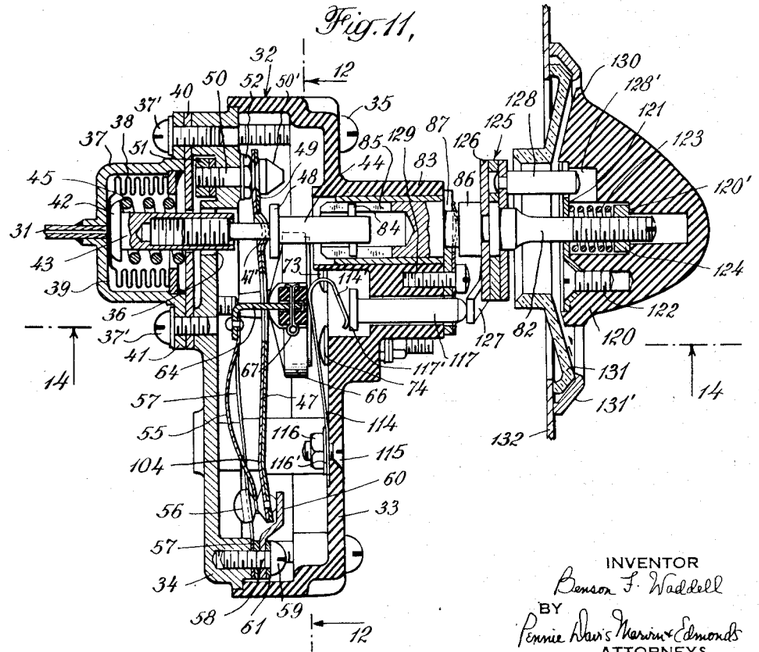
Fig. 11 is an enlarged section on the line 11—11 in Fig. 9.
Figure 12:
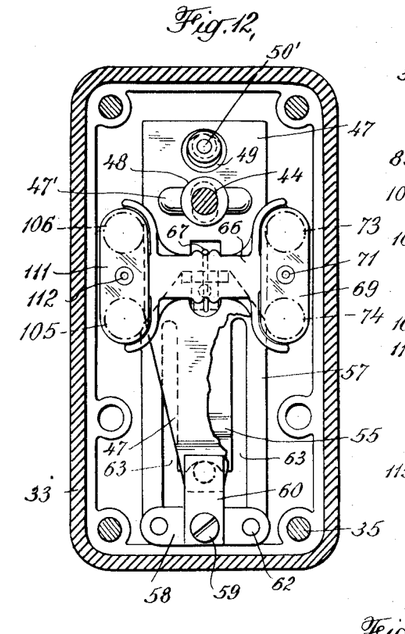
Fig. 12 is a section on the line 12—12 in Fig. 11 with parts of the regulator broken away.
Figure 13:
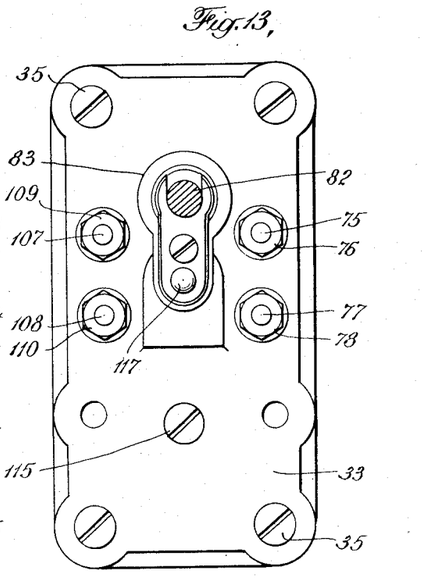
Fig. 13 is a front view of the regulator shown in Fig. 9 with the dial removed.
Figure 14:
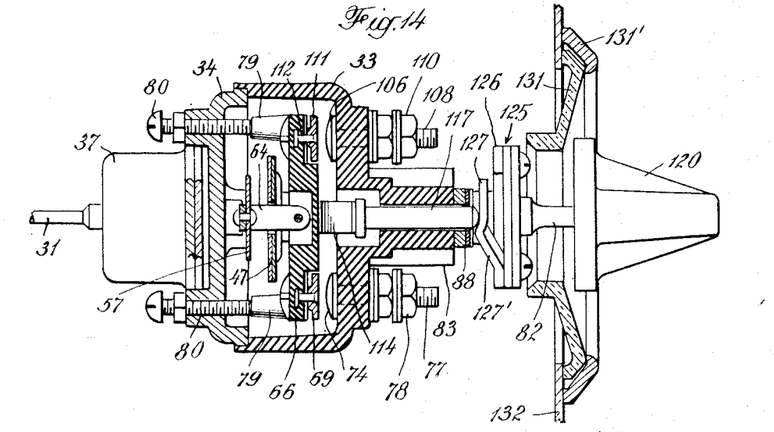
Fig. 14 is a section on the line 14—14 in Fig. 11.

Mounted on the inside of the casing against the inner face of the front section 33 thereof is a spring 114 in the form of a flexible metal strip. The lower end of strip 114 is secured to the front section 33 by a bolt 115 which extends through the front section of the casing and through an opening in the strip 114. A nut 116 is threaded on the inner end of the bolt and is tightened against a washer 116' to clamp the lower end of the spring 114 against the rear face of section 33. From its lower end, the spring 114 extends upwardly to the left, as shown in Fig. 11, and then curves downwardly to the right to form a leg 114'. The leg 114' of the spring coacts with a pin 117 which extends outwardly through the boss 83 in the same opening through which the bolt 89 extends in the regulator shown in Fig. 3. The inner end of pin 117 is formed with a head 117' which is normally in engagement with the leg 114' of spring 114 and prevents the pin 117 from being withdrawn from the casing.

The pin 117 is adapted to be moved axially in the boss 83 by a knob 120. The knob 120 is provided with a central bore into which the threaded outer end of shaft 82 extends. Mounted over the rear face of knob 120 is a plate 121 which is secured in position by a screw 122. A spring 123 is held compressed against the inner face of plate 121 by a nut 124 threaded on the end of shaft 82. The spring 123 urges the knob 120 toward the casing so that a shoulder 120' in the central bore of the knob abuts against the nut 124. Fixed on the shaft 82 between the knob 120 and the front end of boss 83 is a composite plate 125 including a disk 126. The disk 126 is formed with a cam 127 normally engaging the outer end of pin 117. A pin 128 extends forwardly from the front face of plate 125 through an opening in plate 121, the front end of the pin 128 being disposed in a recess 129' in the knob. As shown particularly in Fig. 11, the bolt 89 of the regulator shown in Figs. 1 to 8, inclusive, is omitted and the plate 87 and spring 88 are held in position by a screw 129 extending therethrough and threaded into the front end of boss 83.

The knob 120 is formed with a pointer 130 cooperating with a dial 131. The dial 131 is fixed to a panel 132 on the range by a bezel 131' and is provided with graduations 133 corresponding to different temperatures in the oven, and also with indicia 133' indicating the "off" position of the dial. When the knob 120 is in its "off" position, as shown particularly in Fig. 11, the cam portion 127 of the disk 126 is in engagement with the outer end of pin 117 and holds the pin in its innermost position in the boss 83. In this position of pin 117, the spring 114 is forced to the left against its spring action as seen in Fig. 11, into engagement with the intermediate portion of cross arm 66. The cross arm 66 is thus held by spring 114 out of engagement with contacts 73, 74 and 105, 106. Accordingly, if the rod 44 should be moved to the right due to an expansion of the liquid in bulb 36, the cross arm 66 will be maintained out of engagement with its cooperating contacts irrespective of the operation of the snap-acting mechanism. When the knob 120 is rotated in a clockwise direction from its "off" position, the outer end of pin 117 rides along the inclined portion 127' of cam 127, to the outer face of disk 126, the pin being urged outwardly against the disk by the action of spring 114 which tends to assume a vertical position. Accordingly, when the knob 120 is operated to actuate the snap-acting mechanism, the cam 127 releases the spring 114 and cross arm 66 before the snap-acting mechanism is actuated, so that when the lower end of spring 55 is moved to the left (Fig. 11) through its critical position the spring is free to snap the cross arm 66 into engagement with its cooperating contacts.

It will be observed by reference to Fig. 11 that the dial 131 is concave on its front face and that the knob is normally urged by spring 123 to a forward position in which the front portion of the dial is disposed in the concavity of the member. The knob may be readily withdrawn from the member 131 against the action of spring 123 to move the plate 121 of the dial beyond the end of pin 128. The knob may then be rotated independently of the operating shaft 82. When the recess 129 in the dial is out of alignment with pin 128 and the dial is released, the spring 123 will hold the plate 121 of the dial against the end of the pin. In order to connect the knob again to the operating shaft 82, the knob is rotated until the recess 129 therein is in alignment with pin 128, whereupon the spring 123 will snap the dial to its inner position in which the pin 128 extends through the opening in plate 121 into the recess 129.

Figures 15, 16:
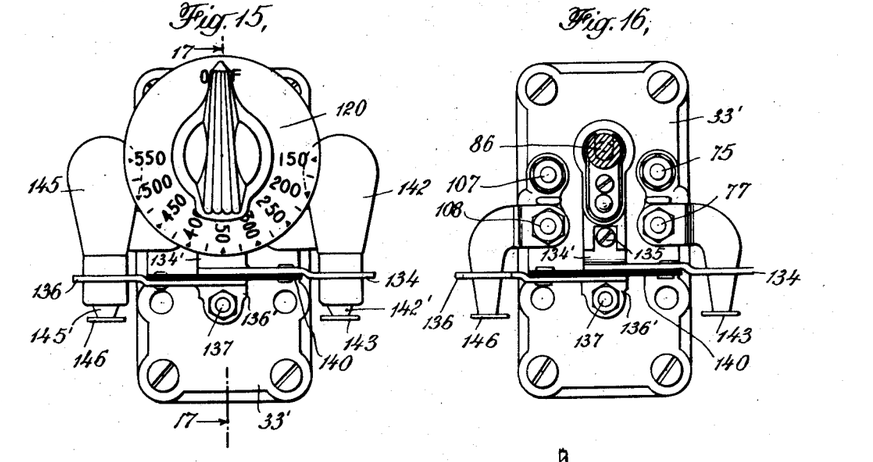
Fig. 15 is a front view of a third form of the new regulator including means for indicating the condition thereof.
Fig. 16 is a similar view of the regulator shown in Fig. 15 with the dial removed.
Figure 17:
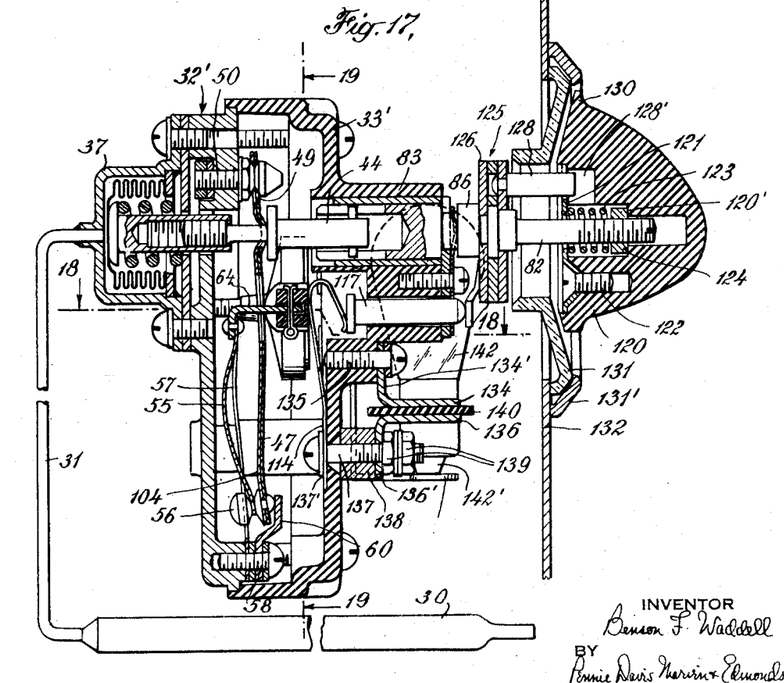
Fig. 17 is an enlarged section on the line 17—17 in Fig. 15.

The regulator shown in Figs. 15 to 19, inclusive, is similar to that shown in Figs. 9 to 14, but is provided in addition with means for indicating the condition of the regulator. The indicating means comprises a conducting member 134 mounted in front of the casing 32 below dial 131 and extending horizontally to the right, as seen in Figs. 15 and 16. The conducting member 134 is provided with an upwardly extending leg 134' connected to the lower portion of the hollow boss 83 by a bolt 135. The bolt 135 is threaded through the boss 83 with its inner end projecting slightly beyond the inner face of the front section 33 of the casing. Accordingly, when the knob 120 is turned to release locking pin 117 and spring 114, the latter will move to the right, as seen in Figure 17, and engage the inner end of bolt 135. Below the conducting member 132 and parallel thereto is a second conducting member 136 extending outwardly to the left, as seen in Figs. 15 and 16. The member 136 is provided with a downwardly extending leg 136' which is secured to the front section 33' of the casing by a bolt 137. The bolt 137 passes through the lower portion of spring strip 114 in place of the bolt 115 shown in Figure 11 and has a washer 137' interposed between the head of the bolt and spring 114. The bolt 137 extends outwardly through the front section 33 and through a collar 138 interposed between the outer face of section 33 and the leg 136'. Lock nuts 139 are threaded on the outer end of bolt 137 and serve to clamp the leg 136' against the collar 138. The upper conducting member 134 and lower conducting member 136 are electrically insulated from each other by a sheet of insulating material 140 disposed between the members and riveted thereto.

The upper conducting member 134 near its outer end (Figs. 15 and 16) is provided with an opening 141 adapted to receive the base of a 110 volt incandescent lamp 142. The contact 142' at the lower end of the lamp engages the end of a conducting strip 143. As shown particularly in Figures 16 and 17, the conducting strip 143 extends inwardly from the contacts 142' and then upwardly and to the left to the terminal bolt 77 of contact 74. The terminal bolt 77 extends outwardly through an opening in the conducting strip 143 near the upper end thereof, the upper portion of the strip being clamped against the front section 33 of the casing by the lock nuts 78. Similarly, the outer end of conducting member 136 is provided with an opening 144 adapted to receive the base of a 110 volt incandescent lamp 145. The contact 145' at the lower end of lamp 145 engages the horizontal lower end of a conducting strip 146 which extends upwardly and to the right to the terminal bolt 108 of contact 106. The bolt 108 extends outwardly through the front section 33 of the casing and through an opening in the upper portion of conducting strip 146, and the strip is clamped against the front face of the casing by the lock nuts 110.

Figures 18, 19, 20, 21, 22, 23:
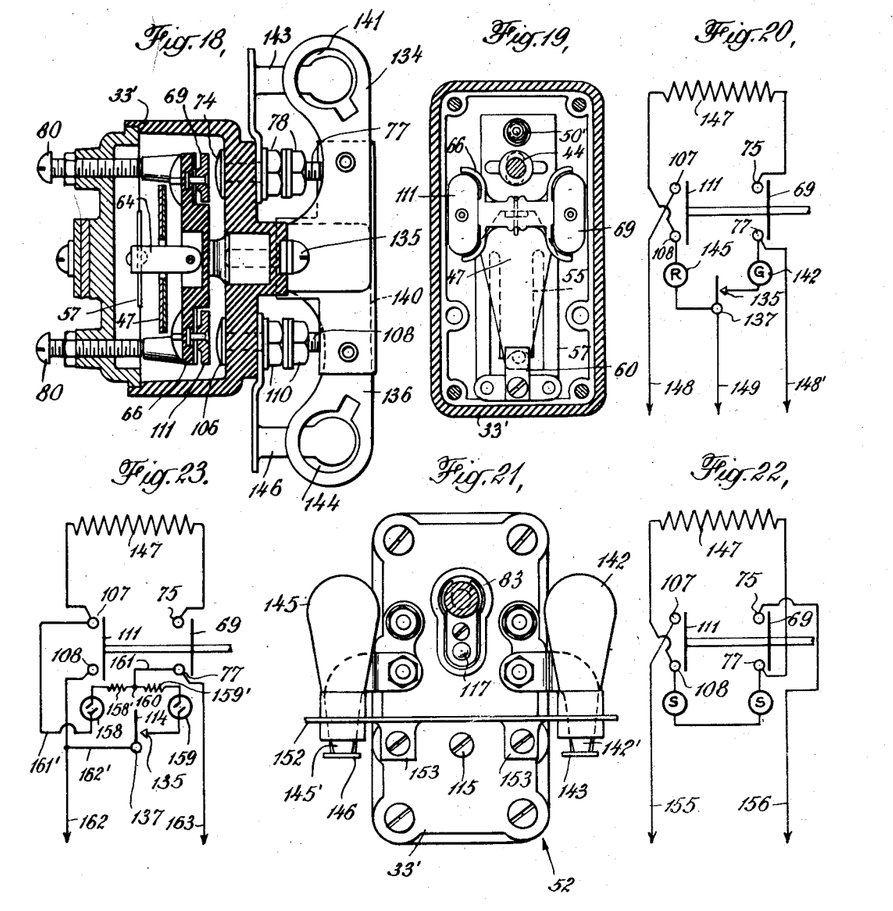
Fig. 18 is a section on the line 18—18 in Fig. 17.
Fig. 19 is a reduced section on the line 19—19 in Fig. 17.
Fig. 20 is a schematic diagram of wiring circuits which may be employed in connection with the regulator shown in Fig. 15.
Fig. 21 is a front view of a modified form of the regulator shown in Fig. 15 with the dial removed.
Fig. 22 is a schematic diagram of wiring which may be employed in connection with the regulator shown in Fig. 21.
Fig. 23 is a schematic diagram of wiring which may be employed in connection with another modified form of the regulator shown in Fig. 15.

In the use of the regulator shown in Figs. 15 to 19, inclusive, the wiring shown diagrammatically in Figure 20 may be employed. As there shown, the heating element 147 of the oven is adapted to be supplied with current from a 220 volt three-wire power line including the wires 148 and 148', between which is a potential of 220 volts, and a neutral wire 149. It will be apparent that between each of the wires 148, 148' and the neutral wire 149 there is a potential of 110 volts. Wire 148 of the power source is connected to terminal bolt 107 of the regulator, and terminal bolt 108 cooperating with terminal 107 is connected to one side of heating element 147. The other side of the heating element is connected to terminal bolt 75 of the regulator, and terminal bolt 77 cooperating with terminal 75 is connected to wire 148' of the power source. The neutral wire 149 is connected to bolt 137 between the lock nuts 139.

In the operation of the device shown in Figs. 15 to 20, inclusive, knob 120 is normally in its "off" position. In this position of the dial, the cam 127 holds locking pin 117 and spring 114 in their innermost positions and thereby prevents bridging of contacts 73, 74 and 105, 106 by their respective conducting members 69 and 111. When the conducting members 69 and 111 are thus disengaged from their cooperating contacts, the lamps 142 and 145 and the heating element 147 of the oven are deenergized. In order to heat the oven, the dial 120 is turned clockwise to release the locking pin 117. As soon as the cam 127 releases pin 117, the spring 114 moves to the right due to its inherent spring action and engages the inner end of bolt 135. Thereupon, a circuit is established which is traceable from wire 148' of the power source through terminal 77, conducting strip 143 (Fig. 16), lamp 142, conducting member 134, bolt 135, spring 114 and bolt 137 (Fig. 17) to the neutral wire 149. Accordingly, a potential of substantially 110 volts will be impressed across the lamp 142, and the latter will be illuminated to indicate that the locking mechanism for the switch has been released. The lamp 142 may be of any desired color, such as green, to provide a suitable signal when illuminated.

As the knob 120 is turned further in a clockwise direction, the snap-acting mechanism is actuated in the manner previously described, whereupon the cross arm 66 is moved forwardly to bridge contacts 73, 74 and 105, 106, respectively. In this position of the parts, a circuit is established which is traceable from wire 148 through terminal bolt 107, contact 105, conducting member 111, contact 106, terminal bolt 108 (Figs. 16 and 19), heating element 147, terminal bolt 75, contact 73, conducting member 69, contact 74, terminal bolt 77 (Figs. 16 and 19) to the wire 148' of the power source. A potential of substantially 220 volts will thus be impressed across the heating element 147 and the latter will heat the oven. Simultaneously with the establishment of the circuit through heating element 147, another circuit will be established which is traceable from wire 148 through terminal bolt 107, contact 105, conducting member 111, contact 106, terminal bolt 108, conducting strip 146, lamp 145, conducting member 136, bolt 137 (Figs. 17 and 18) to the neutral wire 149. Accordingly, a voltage of substantially 110 volts will be impressed across lamp 145, whereby the latter lamp will be illuminated. The lamp 145 is preferably of a red color or any other color distinguishable from the color of lamp 142, and when the lamp 145 is illuminated the operator will be informed that the circuit through heating element 147 is closed and the oven is being heated.

When the oven is heated to the temperature for which the dial 131 is set, the bellows 38 permits the snap-acting mechanism to move back to its initial position and thereby separate the contacts 73, 74 and 105, 106, respectively. The red lamp 145 will then be extinguished to indicate that the desired temperature in the oven has been reached. The green lamp 142, however, will continue to be illuminated to show that the regulator is still turned on. All subsequent actuations of the snap-acting mechanism by the bellows during the time the oven is in use will cause the red lamp 145 to give a signal, as will be readily understood. When the dial 131 is turned back to its "off" position, the cam 127 forces the locking pin 117 and spring 114 inwardly to lock cross arm 66 in its normal circuit-opening position, and simultaneously with the actuation of the locking means the spring 114 disengages bolt 135 and thereby opens the circuit previously traced through lamp 142. The lamp 142 will then be extinguished to indicate that the regulator is in its "off" position.

The regulator shown in Figs. 15 to 20, inclusive, is adapted for use with lamps of the common 110-volt type in connection with a 220-volt three-wire power line. In the event that only a two-wire power line of 220 volts is available, the regulator may be modified as shown in Figs. 21 and 22. As shown in Fig. 21, the bolt 135 is eliminated, and in place of the conducting members 134 and 136 (Figs. 15 to 18) a single conducting member 152 is employed. The member 152 extends horizontally across the front of casing 32 below the boss 83 and is held in position by legs 153 connected to the front section 33 of the casing. Near its left end, as seen in Fig. 21, the member 152 is provided with an opening into which the base of lamp 145 is closely fitted. The contact 145' at the bottom of the lamp engages the contact strip 146. Similarly, near its opposite end, the member 152 is provided with another opening for receiving the base of lamp 142, the contact 142' at the bottom of lamp 142 being in engagement with the conducting strip 143. The bolt 137 (Fig. 17) is eliminated in the regulator shown in Fig. 21, and bolt 115, shown particularly in Fig. 11, is substituted therefor.

The wiring of the modified regulator is illustrated diagrammatically in Fig. 22. As there shown, the heating element 147 is adapted to be energized by current supplied from a 220-volt power line including wires 155 and 156. The wire 155 is connected to terminal bolt 107 of the regulator, and terminal bolt 108 cooperating with terminal 107 is connected to one side of heating element 147. The other side of the heating element is connected to terminal bolt 77. Terminal bolt 75 cooperating with terminal 77 is connected to the other wire 156 of the power line.

When the regulator shown in Figs. 21 and 22 is turned on to release the locking pin 117, the lamps 142 and 145 will remain extinguished. However, when the shaft 82 is turned further in a clockwise direction to actuate the snap-acting mechanism, the conducting members 69 and 111 will be moved into engagement with their respective contacts 73, 74 and 105, 106, whereupon a circuit will be established which is traceable from wire 155 of the power source through the terminal 107, conducting member 111, terminal 108, heating element 147, terminal 77, conducting member 69 and terminal 75 to the other wire 156 of the power source. At the same time, another circuit will be established which is traceable from wire 155 of the power source through terminal 107, conducting member 111, terminal 108, conducting strip 146, lamp 145, conducting member 152, lamp 142, conducting strip 143 and terminal 77 to the other wire 156 of the power line. Thus, the two lamps 142 and 145 will be connected in series across the 220-volt line so that a potential of substantially 110 volts will be impressed across each lamp. The lighting of lamps 142 and 145 will indicate to the operator that the oven is being heated by the element 147. When the oven has been heated to the desired temperature for which the regulator is set, the bellows 38 will permit the snap-acting mechanism to return to its normal position and withdraw conducting members 69 and 111 from their respective contacts, whereby the lamps 142 and 145 will be extinguished and the heating element 147 deenergized.

It will be apparent that other indicating means may be used in place of the incandescent lamps 142 and 145. For example, the regulator shown in Figs. 15 to 19, inclusive, may be modified to accommodate neon tubes 158 and 159, as shown diagrammatically in Fig. 23. Referring to Fig. 23, the neon tube 159 is suitably mounted on the casing in place of the lamp 142 and is connected at one terminal to the bolt 135 (Fig. 17). The other terminal of the tube is connected through a resistance 159' to a terminal 160, from which a wire 161 leads to terminal bolt 77. Similarly, the neon tube 158 is mounted on the casing in place of the incandescent lamp 145 and is connected at one terminal through a resistance 158' to the terminal 160. The other terminal of neon tube 158 is connected by a wire 161' to terminal bolt 107 of the regulator. The heating element 147 is adapted to be energized by a 220-volt power line including wires 162 and 163 connected to terminal bolts 108 and 77, respectively. The other terminal bolts 107 and 75 are connected to opposite sides of the heating element 147. The bolt 137 near the lower end of spring 114 (Fig. 17) is connected by a wire 162' to wire 162 of the power source.

In the operation of the regulator shown diagrammatically in Fig. 23, the mechanism is normally in its "off" position, whereby the neon tubes 158 and 159 are extinguished and heating element 147 is deenergized. When the regulator is turned on to release the locking spring 114, the latter moves into engagement with bolt 135, as previously described, whereupon a circuit is established which is traceable from wire 163 through terminal 77, wire 161, terminal 160, resistance 159', neon tube 159, bolt 135, spring 114, bolt 137 and wire 162' to the other wire 162 of the power source. The neon tube 159 will thus be energized to indicate that the regulator is turned on. When the dial is rotated further in a clockwise direction, the snap-acting mechanism will be actuated in the manner previously described, thereby moving conducting members 69 and 111 into engagement with their respective contacts 73, 74 and 105, 106. A circuit will then be established which is traceable from wire 162 of the power source through terminal 108, conducting member 111, terminal 107, heating element 147, terminal 75, conducting member 69 and terminal 77 to the other wire 163 of the power source, whereby element 147 will be energized to heat the oven. At the same time, another circuit will be established which is traceable from wire 162 through terminal 108, conducting member 111, terminal 107, wire 161', neon tube 158, resistance 158', terminal 160, wire 161', and terminal 77 to the other wire 163 of the power source. The neon tube 158 will then be illuminated to indicate that the heating element 147 is energized.

When the oven has been heated to the desired temperature, the bellows 38 will permit the snap-acting mechanism to return to its initial position and withdraw conducting members 69 and 111 from their respective contacts. Thereupon, the circuits previously traced through heating element 147 and neon tube 158 will be broken, and neon tube 158 will be extinguished to indicate that the oven has been heated to the required temperature. The neon tubes 158 and 159 are preferably of distinguishable colors, whereby the operator may be more readily informed as to the condition of the regulator. The resistances 158' and 159' may be of any desired ohmic value to permit the flow of the necessary current through the neon tubes.

I claim:

1. In a regulator, a snap acting mechanism comprising a pair of relatively movable tension members, a compression member connected at one end to one of the tension members and at the opposite end to the other tension member and normally maintaining said first members under tension, and means for actuating one of the tension members to move the adjacent end of the compression member through the centerline of the other tension member.

2. In a regulator, a snap acting mechanism comprising a pair of generally parallel, opposed tension members, means at one end of one member and at the remote end of the other member for mounting the members, the free ends of the members being relatively movable, a compression member extending between the tension members from the free end portions thereof and normally maintaining said first members under tension, and means for actuating one of the tension members to move the adjacent end of the compression member through the centerline of the other tension member.

3. A regulator comprising a laterally movable bar, a member generally parallel to the bar and movable laterally relative thereto, means for securing the bar and member against relative endwise movement, a compression spring connected at one end to the bar and at the other end to the member and normally extending at an angle to the member with the first end of the spring disposed on one side of the plane of the member, means for moving the bar and the member relatively against the action of the spring to force said first end of the spring to the opposite side of the plane of the member, and control means operatively connected to one of said spring, member and bar.

4. A regulator comprising a laterally movable bar, a member having one end disposed between the ends of the bar and movable laterally relative thereto, means for securing the bar and the member against endwise movement, a spring confined in compression between one end of the bar and one end of the member and normally exerting an expansive force at an angle to the member to urge said end of the member in one direction relative to the bar, the bar being movable against the action of the spring to a critical position in which the expansive force of the spring is substantially parallel to the member, means for moving the bar beyond said critical position to cause the spring to reverse its action and urge said end of the member in the opposite direction relative to the bar, and control means operatively connected to one of said bar, spring and member.

5. A regulator comprising a laterally movable bar, a member substantially parallel to the bar having one end disposed between the ends of the bar and movable laterally relative thereto, means for securing the bar and member against endwise movement, a spring arranged in compression between said end of the member and one end of the bar and normally exerting an expansive force in one direction relative to the member to urge said end of the member away from the bar, means for moving the bar to cause the spring to exert an expansive force in the opposite direction relative to the member and thereby urge said end of the member toward the bar, and control means operatively connected to one of said spring, member and bar.

6. A regulator comprising a bar pivoted near one end, a member substantially parallel to the bar having one end disposed between the ends of the bar and movable laterally relative thereto, means for securing the member against endwise movement, a spring confined in compression between said end of the member and the free end of the bar and normally exerting an expansive force at an angle to the member to urge the free end of the member and bar away from each other, the bar being movable against the action of the spring to a critical position in which the expansive force of the spring is substantially parallel to the member, means for moving the bar and member relatively beyond said critical position to cause the spring to reverse its action and urge said end of the member and the bar relatively toward each other, and control means operatively connected to one of said bar, spring and member.

7. A regulator comprising a laterally movable bar, means for securing the bar against endwise movement, a member fixed at one end and movable laterally relative to the bar, the free end if the member being disposed inwardly from one end of the bar, a compression spring extending outwardly from the free end of the member with its outer end connected to the bar on one side of the member, the spring normally urging the bar in one direction relative to the member, means for moving the outer end of the spring to the other side of said member to cause the spring to urge the member in the opposite direction relative to the bar, and control means operatively connected to said member.

8. A regulator comprising a laterally movable bar, means for securing the bar against endwise movement, a flexible member anchored at one end near one end of the bar, a spring extending from the free end of the member outwardly toward said end of the bar and movable relative to the plane of the member, a connection between the bar and the outer end of the spring for subjecting the spring to compression with its outer end on one side of the plane of said member, the spring normally exerting an expansive force in one direction relative to the plane of the member to urge the free end of the member away from the bar, means for varying the relative positions of said bar and member to move the outer end of the spring through the plane of the member to the opposite side thereof, whereby the spring snaps the free end of the member toward the bar, and control means operatively connected to one of said flexible member, bar and spring.

9. A regulator comprising a laterally movable bar, means for securing the bar against endwise movement, biasing means coacting with the bar including a flexible strip connected to the bar near one end thereof and extending inwardly from said end of the bar and a pair of flexible legs integral with the inner end of the strip and extending outwardly on opposite sides thereof toward said end of the bar, means for fixing the outer ends of said legs to confine the strip in compression between the inner ends of the legs and the outer end of the bar with the outer end of the strip disposed on one side of the plane of the legs, said strip normally urging the inner ends of the legs in one direction relative to the bar, means for moving the outer end of the strip through the plane of the legs to the opposite side thereof to cause the strip to snap the legs in the opposite direction relative to the bar, and control means operatively connected to one of said bar and biasing means.

10. In a regulator, a snap-acting mechanism comprising a bar pivoted at one end, a spring including a pair of spaced parallel legs having their inner ends disposed inwardly from one end of the bar and an intermediate leg integral with the inner ends of said parallel legs and extending outwardly toward said end of the bar, the intermediate leg normally lying in the plane of said parallel legs, means for fixing the outer ends of said parallel legs near the free end of the bar, a connection between the bar and the outer end of the intermediate leg for confining the intermediate leg in compression against said parallel legs with the outer end of the intermediate leg distorted out of the plane of the parallel legs on one side thereof, the intermediate leg normally urging the inner end of the spring away from the bar, means for moving the bar about its pivot to force the outer end of the intermediate leg through the plane of said parallel legs to the opposite side thereof, and control means operatively connected to the inner end of the spring.

11. In a regulator, a snap-acting mechanism comprising a bar pivoted near one end, a compression spring connected at its outer end with the bar near the free end thereof, a flexible member connected at one end to the opposite end of the spring, means for fixing the other end of the flexible member near the free end of the bar to compress the spring, the spring normally subjecting said bar and flexible member to tension, and means for moving the free end of the bar and the outer end of the spring relative to the plane of said member, and control means operatively connected to the snap-acting mechanism.

12. A regulator comprising a laterally movable bar, a member having one end disposed between the ends of the bar and movable laterally relative thereto, means for securing the bar and member against endwise movement, a spring confined in compression between one end of the bar and one end of the member and normally exerting an expansive force at an angle to the member to urge said end of the member away from the bar to a normal position, the bar and member being movable relatively toward each other against the action of the spring to a critical position in which the expansive force of the spring is substantially parallel to the member, means for moving the bar and member relatively beyond said critical position to cause the spring to reverse its action and urge said end of the member toward the bar, means for adjusting the member to vary said normal position thereof, and control means operatively connected to one of said bar, spring and member.

13. A regulator comprising a laterally movable bar, a member substantially parallel to the bar and movable laterally relative thereto, means for securing the bar and member against relative endwise movement, a compression spring connected at one end to the bar and at the other end to the member and normally extending at an angle to the member with the first end of the spring disposed on one side of the plane of the member, a thermo-responsive element for moving the bar relative to the member against the action of the spring to force said end of the spring to the opposite side of the plane of the member, and control means operatively connected to one of said spring, member and bar.

14. A regulator comprising a laterally movable bar, a member substantially parallel to the bar and movable laterally relative thereto, means for securing the bar and member against relative endwise movement, a compression spring connected at one end to the bar on one side of the plane of the member and at the other end to the member and normally extending at an angle to the member, thermo-responsive means, a connection between the thermo-responsive means and the bar for moving the bar against the action of the spring to force said first end of the spring to the opposite side of the plane of the member, means for adjusting said connection to vary the relative positions of the bar and the thermo-responsive means, and control means operatively connected to one of said spring, member and bar.

15. In a regulator, a snap-acting mechanism, a cross arm operatively connected to the snap-acting mechanism and movable relative thereto about an axis, control means at each end of the cross arm including a pair of contacts and a conducting member adapted to bridge the contacts, a pivot near each end of the cross arm for connecting one of said conductor and pair of contacts to the arm for movement about an axis at an angle to the first axis, and means for actuating the snap-acting mechanism to move said conductors into engagement with their respective contacts.

16. A regulator comprising a casing, a bar pivoted near one end in the casing, a flexible strip fixed to the casing near the free end of the bar and extending inwardly therefrom, a member connected to said strip near the inner end thereof and movable relative to the strip about an axis, a conductor carried by said member and movable thereon about an axis at an angle to said first axis, a pair of contacts fixed in the casing and adapted to be bridged by the conductor, a spring confined in compression between the free end of the bar and the inner end of the strip with its outer end on one side of the plane of the strip, the spring being operable to urge the inner end of the strip and said member away from the contacts, and means for actuating the bar to move the outer end of the spring through the plane of said strip to the other side thereof, whereby the spring snaps the inner end of the strip and said member toward the contacts to engage the conductor therewith.

17. In a regulator, a pair of relatively movable tension members, one of said members being a bimetallic bar, a compression member connected at one end to one of the tension members and at the opposite end to the other tension member and normally maintaining said first members in tension, and thermo-responsive means for actuating the bimetallic bar to move the adjacent end of the compression member through the centerline of the other tension member.

18. In a regulator, a pair of relatively movable, generally parallel tension members, one of said members being a bimetallic bar pivoted at one end, the opposite end of the bar extending obliquely to the body of the bar to compensate variations in the effective length of the bar due to flexing thereof, a compression member connected at one end to said oblique end of the bar and at the opposite end to the other tension member and normally maintaining said first members in tension, and thermo-responsive means for actuating the bimetallic bar to move the adjacent end of the compression member through the centerline of the other tension member.

19. In a regulator, a laterally movable bar, a tension member on one side of the bar and generally parallel thereto, means for securing the bar and member against relative endwise movement, a compression spring connected at one end to the bar and at the opposite end to the tension member and normally maintaining said bar and member in tension, means for moving the bar laterally to force the adjacent end of the spring through the centerline of the tension member, a control element on the opposite side of the bar, and means extending transversely of the bar for connecting the tension member and the control element.

BENSON F. WADDELL.